United States Patent [19]

Waddill

[11] Patent Number: 4,910,269

[45] Date of Patent: Mar. 20, 1990

[54] POLYETHER POLYAMINE-PIPERAZINE CURED CYCLOALIPHATIC EPOXY RESIN COMPOSITIONS

[75] Inventor: Harold G. Waddill, Austin, Tex.

[73] Assignee: Texaco Chemical Co., White Plains, N.Y.

[21] Appl. No.: 256,950

[22] Filed: Oct. 13, 1988

Related U.S. Application Data

[63] Continuation-in-part of Ser. No. 67,074, Jun. 29, 1987, abandoned.

[51] Int. Cl.$^4$ .............................................. C08L 63/10
[52] U.S. Cl. ................................. 525/532; 528/407
[58] Field of Search .......................................... 525/532

[56] References Cited

U.S. PATENT DOCUMENTS

| | | | |
|---|---|---|---|
| 4,051,195 | 9/1977 | McWhorter | 525/532 |
| 4,189,564 | 2/1980 | Waddill | 528/94 |
| 4,195,153 | 3/1980 | Waddill | 528/94 |
| 4,383,090 | 5/1983 | Slocki et al. | 528/109 |
| 4,487,805 | 12/1984 | Sellstrom | 525/523 |
| 4,528,345 | 7/1985 | Waddill | 525/523 |
| 4,588,788 | 5/1986 | Emmons et al. | 525/532 |

*Primary Examiner*—Lewis T. Jacobs
*Assistant Examiner*—Robert E. L. Sellers, II
*Attorney, Agent, or Firm*—Jack H. Park; Kenneth R. Priem; Richard A. Morgan

[57] ABSTRACT

The invention is an epoxy resin coating composition. The composition comprises:
1. a cycloaliphatic epoxy resin (hydrogenated bisphenol A resin), and
2. a triacrylate ester, reacted with a mixture of
3. a polyether polyamine of the formula:

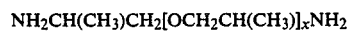

a.

wherein x ranges from 2 to 6, or
b.

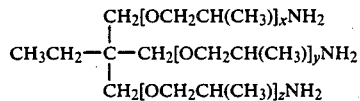

wherein x+y+z ranges from 4 to 6; and
4. piperazine.

The weather resistant formulations cure rapidly to form blemish-free, attractive, high-gloss coatings.

16 Claims, No Drawings

POLYETHER POLYAMINE-PIPERAZINE CURED CYCLOALIPHATIC EPOXY RESIN COMPOSITIONS

CROSS-REFERENCE TO RELATED APPLICATION

This application is a continuation-in-part of Application Ser. No. 07/067,074, filed June 29, 1987, now abandoned for Rapid Curing Weather Resistant Epoxy Coatings to H. G. Waddill.

BACKGROUND OF THE INVENTION

1. Field of the Invention

The invention relates to improved rapid curing, weatherable epoxy coatings.

2. Description of Other Relevant Materials in the Field

Cycloaliphatic epoxy resins prepared by the hydrogenation of glycidyl ethers of bisphenol A or other di- or polyphenols may be reacted with selective curatives to form coatings that are resistant to UV degradation. Cycloaliphatic epoxy resins are prepared by the process described in U.S. Pat. No. 3,336,241. These resins are much less reactive with conventional epoxy curatives than are the phenolic-based glycidyl ethers.

U.S. Pat. No. 4,051,195 to W. F. McWhorter teaches curable epoxy resin compositions comprising (1) a blend of an epoxide resin and a polyacrylate or polymethacrylate ester of a polyol wherein the ester contains more than one terminal acrylate or methacrylate and (2) an aliphatic polyamine curing agent. The weight ratio of epoxide resin: ester is 100:5 to 100:100. The aliphatic polyamine is incorporated into the resin composition in a specified amount. The epoxy resin compositions are said to cure rapidly even at low temperature and are useful as coatings and adhesives.

U.S. Pat. No. 4,528,345 to H. G. Waddill teaches a method for making weather-resistant epoxy coatings. The method comprises prereacting a cycloaliphatic diepoxide resin with aminoethylpiperazine or a mixture of aminoethllpiperazine and polyoxyalkylenepolyamine in an amount which is balance to give the maximum level of primary amine reaction without yielding an excessively viscous reaction product. The prereacted product is reacted with a curing amount of a polyoxyalkylene polyamine and an accelerator.

U.S. Pat. No. 4,189,564 to H. G. Waddill teaches an accelerator for curing epoxy resins. The accelerator comprises piperazine, N-aminoethylpiperzine and triethanolamine. The product comprising 65 to 80 wt % triethanolamine, 10 to 20 wt % piperazine and 5 to 1 wt % N-aminoethylpiperazine is sold commercially as Accelerator 399 by Texaco Chemical Co. The accelerator is said to be synergistic for accelerating the curing of a polyglycidyl ether of a polyhydric phenol cured with a polyoxyalkylene polyamine at ambient or elevated temperatures. Such amines include polyoxypropylene diamines of the formula:

$$NH_2CH(CH_3)CH_2[OCH_2CH(CH_3)]_xNH_2$$

wherein x ranges from 2 to 40. Such amines also include polyoxypropylene triamines of the formula:

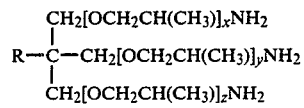

wherein R is a lower alkyl and $x+y+z$ ranges from 3 to 40.

These diamines and triamines may be synthesized according to U.S. Pat. No. 3,654,370 to E. L. Yeakey which teaches a method comprising a nickel, copper and chromium catalyst for aminating polyols.

U.S. Pat. No. 4,588,788 teaches the esterification products of a mixture of carboxylic acids of the formula $$CH_2=CHCO_2(CHCH_2CO_2)_nH.$$

This product and a mono- or polyhydric compound are used as reactive diluents for polyepoxides which are reacted with an aliphatic amine curing agent.

SUMMARY OF THE INVENTION

The invention is an epoxy resin coating composition. The epoxy component comprises a mixture of a cycloaliphatic epoxy resin containing at least 1.8 reactive 1,2-epoxy groups per molecule and an acrylate ester which contains at least three terminal acrylate or metaacrylate groups in a weight ratio of 2:1 to 10:1. The curative component comprises a curing amount of a polyether polyamine. The curative additionally comprises a piperazine accelerator in molar equivalence with the acrylate ester.

The two components are reacted and cured to form an attractive, weatherable, non-yellowing coating free of surface blemishes.

DESCRIPTION OF THE PREFERRED EMBODIMENTS

The invention is an improvement in U.S. Pat. No. 4,051,195 to W. R. McWhorter, incorporated herein by reference.

An improved epoxy formulation has been developed which cures rapidly to form attractive, blemish-free, high-gloss coatings. The formulation comprises a blend of a cycloaliphatic epoxy resin and a polyacrylate ester, cured with a mixture of a polyether polyamine and a reactive amine accelerator derived from piperazine.

It has been found that the addition of piperazine to the acrylate ester-epoxy resin system of U.S. Pat. No. 4,051,195 shortened drying time and promoted rapid curing of the epoxy resin with the selected polyether polyamines demonstrated in the Example.

The cycloaliphatic epoxy resins useful in the invention are those, for example, which are made by the process disclosed in U.S. Pat. No. 3,336,241. Preferred cycloaliphatic epoxy resins are the hydrogenated glycidyl ethers of 2,2-bis(4-hydroxyphenyl)propane which is then called 2,2-bis(4-hydroxycyclohexyl)propane. Othercycloaliphatic epoxy resins such as those described in U.S. Pat. No. 3,336,241 may also be used by those skilled in the art using the invention described herein to effect weather-resistant epoxy coatings.

The acrylate esters useful in this invention are those esters which contain three or more terminal acrylate or methacrylate groups. These esters include the acrylic and methacrylic acid esters of aliphatic polyhydric alcohols such as, for example, the polyacrylatesand polymethacrylates of alkylene polyols, oxyalkylene polyols, alicyclic polyols and higher polyols such as trimethylolethane, trimethylolpropane, pentaerythritol, dipentaerythritol, tripentaerythritol and the like, or mixtures of these with each other or with their partially esterified analogs.

Typical compounds include but are not limited to trimethylolpropane triacrylate, trimethylolethane triacrylate, trimethylolpropane trimethacrylate, trimethylolethane trimethacrylate, pentaerythritol triacrylate, pentaerythritol tetraacrylate, dipentaerythritol tetraacrylate, dipentaerythritol pentaacrylate, and the like. Particularly preferred esters are trimethylolpropane triacrylate, pentaerythritol triacrylate, and pentaerythritol tetraacrylate.

The procedures for preparing these acrylate and methacrylate esters of epoxide resins is described in U. S. Pat. No. 3,377,406 incorporated by reference.

The acrylate or methacrylate esters are blended with the epoxide resins in the weight ratio of about 5 to about 100 parts of ester for each 100 parts of epoxide resin.

Of the amine curing agents known to be effective in curing a vicinal epoxy resin, preferred curing agents in accordance with the instant invention are the polyoxyalkylene containing amine compounds. A preferred class of polyoxyalkylene polyamines is of the formula:

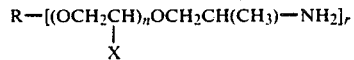

wherein X is hydrogen, methyl or ethyl radical; R is the nucleus of an oxyalkylation susceptible polyhydric alcohol containing 2 to 12 carbon atoms and 2 to 8 hydroxyl groups and; n is a number from 1 to about 15 and r is a number from 2 to 4.

The most preferred polyoxyalkylene polyamines are polyoxypropylene diamine having a molecular weight of about 230 or a triamine of molecular weight about 400. These products are available under the tradename JEFFAMINE ® D-230 and JEFFAMINE ® T-403 from Texaco Chemical Co. Their use as curing agents is described in U.S. Pat. No. 4,189,564.

JEFFAMINE ® D-230 is represented by the formula:

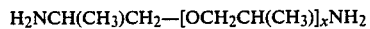

wherein x averages 2.6.

JEFFAMINE ® T-403 is represented by the formula:

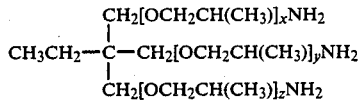

wherein x+y+z averages 5.3.

The reactive amine accelerators of the instant invention are piperazine compounds which are described, for example, in U.S. Pat. No. 3,875,072 and U.S. Pat. No. 4,528,345 to Waddill incorporated herein by reference. The preferred accelerator is piperazine itself. N-aminoethylpiperazine is shown in the Example to produce good coatings.

The piperazine compound is incorporated in an amount which will ensure a maximum level of primary amine reaction but give a reaction product which is not too viscous to handle. The greater the ratio of accelerator to acrylate ester, the less primary amine is reacted. However, a large excess of epoxy resin will result in a very viscous product or even a gel which is undesirable. However, excess piperazine compound is undesirable because of extraneous reactions. Accordingly, the instant coatings are formulated with piperazine compound in an approximate equivalence with the acrylate ester.

This invention is shown by way of Example.

EXAMPLE 1-A

| | | | 6213- | | | 6253- |
|---|---|---|---|---|---|---|
| | 4A | 4B | 56A | 66A | 66B | 19E |
| Formulation, pbw | | | | | | |
| Cycloaliphatic epoxy resin (5) | 100 | 90 | 90 | 90 | 80 | 70 |
| TMP triacrylate | — | 10 | 10 | 10 | 20 | 30 |
| JEFFAMINE ® T-403 | 34 | 39 | 30.6 | 30.6 | 27.2 | 23.8 |
| Piperazine | — | — | 4.4 | 4.4 | 8.8 | 13.2 |
| Solvent | — | — | 10[1] | 15[2] | 30[2] | 45[2] |
| Coating Properties | | | | | | |
| Drying time, 6 mil film | | | | | | |
| Set-to-touch, hrs | 21.4 | 12.2 | 1.1 | 1.5 | <0.1 | <0.1 |
| Surface-dry, hrs | 25.8 | 14.6 | 2.3 | 2.8 | 0.5 | 0.8 |
| Thru-dry, hrs | 31.2 | 36 | >25 | >24 | 3.4 | — |
| Pencil hardness after: | | | | | | |
| 24 hrs, 25° C. | >3B[3] | >3B[3] | >3B[3] | >3B[3] | >3B[3] | HB[4][7] |
| 48 hrs, 25° C. | — | — | H[4] | HB[4] | HB[6] | F—H[4] |
| 72 hrs, 25° C. | 2B | H | 2H[4] | H[4] | H[4] | 2H[4] |
| 7 day, 25° C. | HB | 2B | H | HB[4] | HB[4] | 2H[4] |
| 24 hrs 25° C., 1 hr 80° C., 1 hr 125° C. | HB | B | H | F—H | F | F |
| Gardner impact, in-lbs to fail after: | | | | | | |
| 24 hrs 25° C. | | | ←>160/>160→ | | | |
| 48 hrs 25° C. | | | ←>160/>160→ | | | |
| (dir./rev.) 72 hrs 25° C., | | | ←>160/>160→ | | | |
| 7 days 25° C., 24 hrs 25° C., | | | ←>160/>160→ | | | |

-continued

Coating Properties: Cure of Cycloaliphatic Epoxy Resin/Trimethylolpropane Triacrylate Blends with JEFFAMINE ® T-403/Piperazine Curative Systems

|  | 6213- | | | | | 6253- |
|---|---|---|---|---|---|---|
|  | 4A | 4B | 56A | 66A | 66B | 19E |
| 1 hr 80° C., 1 hr 125° C., | ←>160/>160→ | | | | | |

(1)Solvent: n-butanol;
(2)Solvent: 50/50 blend: ethanol/n-butanol;
(3)Coating soft, easily marred;
(4)Indented without permanent marring with softer leads;
(5)EPONEX ® 151, Shell Chemical;
(6)Tacky, undercured surface;
(7)Slightly tacky surface.

Coating of cycloaliphatic epoxy and JEFFAMINE ® T-403 cured very slowly to form soft, flexible film. Addition of trimethylolpropane (TMP) triacrylate improved drying times somewhat but tack-free time still lengthy and the coatings were soft. Addition of piperazine in an amount equivalent to the acrylate material present in the formulation shortened drying time considerably, particularly when the acrylate was 20–30% of total resin amount. Such coatings exhibited rapid curing, formed initially soft, flexible coatings which hardened rapidly to tough, blemish-free, high gloss flexible coatings that were difficult to mar.

Samples 6213-4A and -4B of Example 1A were retested with two solvent systems. Similar properties were achieved with and without solvent.

Comparing results from 6406-73B, -73C, -73E and -73F with data of Example 1-A, indicates no advantage in using a solvent, either n-butanol or an ethanol/n-butanol mixture, with JEFFAMINE ® T-403 as a curative. This was the case with either a cycloaliphatic epoxy resin (6113-4A) or with a blend of the cycloaliphatic resin with TMP triacrylate (6213-4B). Addition of piperazine, a very reactive amine, in an amount equivalent to the amount of triacrylate present in the formulation, was necessary to achieve rapid gellation and an improvement in drying time.

EXAMPLE 1-B

|  | 6406 | | | |
|---|---|---|---|---|
|  | -73B | -73C | -73E | -73F |
| Formulation, pbw | | | | |
| Cycloaliphatic epoxy resin | 100 | 100 | 90 | 90 |
| TMP triacrylate | — | — | 10 | 10 |
| JEFFAMINE ® T-403 | 34 | 34 | 39 | 39 |
| Solvent | 10(1) | 15(2) | 10(1) | 15(2) |
| Coating Properties | | | | |
| Drying time, 6 mil film | | | | |
| Set-to-touch, hrs | 19.6 | 19.8 | 13.2 | 12.0 |
| Surface-dry, hrs | 23.7 | 23.9 | 14.5 | 13.1 |
| Thru-dry, hrs | 34.9 | 32.0 | 37 | >36 |
| Pencil hardness after: | | | | |
| 24 hrs 25° C. | >3B(3) | >3B(3) | >3B(3) | >3B(3) |
| 48 hrs 25° C. | — | — | — | — |
| 72 hrs 25° C. | H(4) | H(4) | H(4) | H(4) |
| 7 days 25° C. | H | H | F—H(4) | F—H(4) |
| 24 hrs 25° C., 1 hr 80° C., 1 hr 125° C. | H | F—H | F | F |
| Gardner impact, in-lbs to fail after: | | | | |
| 24 hrs 25° C. | >160/>160 | >160/>160 | >160/>160 | >160/>160 |
| 48 hrs 25° C. | — | — | — | — |
| (dir./rev.) 72 hrs 25° C. | >160/>160 | >160/>160 | >160/>160 | >160/>160 |
| 7 days 25° C. | >160/>160 | >160/>160 | >160/>160 | >160/>160 |
| 24 hrs 25° C., 1 hr 80° C., 1 hr 125° C., | >160/>160 | >160/>160 | >160/>160 | >160/>160 |

(1)Solvent: n-Butanol
(2)Solvent = 50/50 pbw. blend of n-butanol/ethanol
(3)Coating soft, undercured; easily marred
(4)Indented without marring with softer leads

EXAMPLE 1-C

|  | 6406 | | | |
|---|---|---|---|---|
|  | -93A | -93B | -93C | -93D |
| Formulation, pbw | | | | |
| Cycloaliphatic epoxy resin | 80 | 80 | 80 | 80 |
| TMP triacrylate | 20 | 20 | 20 | 20 |
| Triethylenetetramine | 8 | — | — | — |
| N—Aminoethylpiperazine | — | 15 | — | — |
| Isophoronediamine | — | — | 15 | — |

| | 6406 | | | |
|---|---|---|---|---|
| | -93A | -93B | -93C | -93D |
| JEFFAMINE ® EDR-148 | — | — | — | 13 |
| Piperazine | 8.8 | 8.8 | 8.8 | 8.8 |
| Solvent[1] | 30 | 30 | 30 | 30 |
| Coating Properties | | | | |
| Drying time, 6 mil film | | | | |
| Set-to-touch, hrs | 0.5 | 2.9 | 0.1 | 1.0 |
| Surface-dry, hrs | 1.2 | 3.7 | 0.8 | 2.0 |
| Thru-dry, hrs | 1.2 | 6.3 | >24 | 21.8 |
| Pencil hardness after: | | | | |
| 24 hrs 25° C., | >2B[3] | >3B[2,4] | >3B[4] | 2B[2,4] |
| 48 hrs 25° C. | B-2B[3] | >3B[3,4] | >3B[4] | B[2,4] |
| 72 hrs 25° C. | B[2] | >3B[3,4] | >3B[4] | B[4] |
| 7 days 25° C. | F[2] | 2B[2,4] | B[4] | B[2,5] |
| Gardner impact, in-lbs to fail after: | | | | |
| 24 hrs 25° C. | >160/>160 | >160/>160 | >160/>160 | >160/>160 |
| 48 25° C. | >160/>160 | >160/>160 | >160/>160 | >160/>160 |
| 72 25° C. | >160/>160 | >160/>160 | >160/>160 | >160/>160 |
| 7 days 25° C. | >160/>160 | >160/>160 | >160/>160 | >160/>160 |

[1] Solvent: 50/50 pbw mixture of ethanol/n-butanol
[2] Heavy blush
[3] Light blush
[4] Mottled surface
[5] Whitened, dull surface Substitution of several commonly used aliphatic amine curatives of epoxy resins for a hindered triamine (JEFFAMINE® T-403) resulted in rapid curing with the TMPTA/piperazine system. However, coatings prepared with these amines suffered from blushing and/or surface defects. Such coatings remained soft and were generally unsatisfactory for an extended time period. Thus, it is necessary to use a hindered amine curative such as D-230, T-403 or D-400 in order to develop high gloss coatings with acceptable appearance. Triethylene glycol diamine (EDR-148) is not hindered, hence more reactive, and did not produce satisfactory properties for coatings.

EXAMPLE 1-D

| | 6253 | | |
|---|---|---|---|
| | -69A | -69B | -69C |
| Formulation, pbw | | | |
| EPONEX ® 151 | 80 | 80 | 80 |
| TMPTA[1] | 20 | — | — |
| HDADA[2] | — | 20 | — |
| PETA[3] | — | — | 20 |
| Piperazine | 8.8 | 7.6 | 9.8 |
| n-Butanol | 15 | 14.85 | 15.1 |
| Ethanol | 15 | 14.85 | 15.1 |
| JEFFAMINE ® T-403 | 27.2 | 27.2 | 27.2 |
| Drying time, 6 mil film | | | |
| Set-to-touch, hrs | <0.1 | 33.8 | <0.4 |
| Surface-dry, hrs | 0.6 | 42.0 | 0.4 |
| Thru-dry, hrs | 0.6 | 56.8 | 42 |
| Pencil hardness after: | | | |
| 24 hrs 25° C. | >3B[4] | (6) | >3B[4] |
| 48 hrs 25° C. | >3B[4] | (6) | >3B[4] |
| 72 hrs 25° C. | H[5] | >3B[4] | B[5] |
| 7 days 25° C. | HB[8] | HB[7] | HB[8] |
| 24 hrs 25° C., 1 hr 80° C., 1 hr 125° C. | HB | F—H | F |
| Gardner impact, in-lbs to fail after: | | | |
| 24 hrs 25° C. | >160/>160 | (6) | >160/>160 |
| 48 hrs 25° C. | >160/>160 | (6) | >160/>160 |
| 72 hrs 25° C. | >160/>160 | >160/>160 | >160/>160 |
| 7 days 25° C. | >160/>160 | >160/>160 | >160/>160 |
| 24 hrs 25° C., 1 hr 80° C., 1 hr 125° C. | >160/>160 | >160/>160 | >160/>160 |

[1] Trimethylolpropane triacrylate
[2] Hexanediol diacrylate
[3] Pentaerythritol tetraacrylate
[4] Weak, tacky coating; undercured
[5] Indented without marring with softer leads
[6] Incomplete cure; could not test; coating v. soft; v. tacky
[7] Slightly tacky surface
[8] High gloss surface without blemishes
Formulation 6253-66B repeated Formulation 6213-66B of Example 1-A. Improved cure rates and better film properties were achieved with a triacrylate or tetraacrylate than a diacrylate.

EXAMPLE 2

| Coatings Properties: Curing Cycloalipathic Epoxy Resin/TMP Triacrylate Blends with JEFFAMINE ® T-403 and Other, More Reactive Amines | | | | | | | | |
|---|---|---|---|---|---|---|---|---|
| | 6253- | | | | | | | |
| | -58A | -58B | -58C | -58D | -59A | -59B | -59C | -59D |
| Formulation: | | | | | | | | |
| Cycloaliphatic epoxy resin[7] | 80 | 80 | 80 | 80 | 80 | 80 | 80 | 80 |
| TMP triacrylate | 20 | 20 | 20 | 20 | 20 | 20 | 20 | 20 |
| JEFFAMINE ® T-403 | 27.2 | 27.2 | 27.2 | 27.2 | 27.2 | 27.2 | 27.2 | 27.2 |
| AEP[8] | 8.7 | — | — | — | — | — | — | — |
| BAPP[9] | — | 10.1 | — | — | — | — | — | — |
| TETA[10] | — | — | 4.9 | — | — | — | — | — |
| IPDA[11] | — | — | — | 8.6 | — | — | — | — |

-continued

Coatings Properties: Curing Cycloalipathic Epoxy Resin/TMP Triacrylate Blends with JEFFAMINE ® T-403 and Other, More Reactive Amines

| | 6253- | | | | | | | |
|---|---|---|---|---|---|---|---|---|
| | -58A | -58B | -58C | -58D | -59A | -59B | -59C | -59D |
| 1,2-DACH[12] | — | — | — | — | 5.8 | — | — | — |
| MIBPA[13] | — | — | — | — | — | 7.3 | — | — |
| BAEE[14] | — | — | — | — | — | — | 5.3 | — |
| JEFFAMINE ® EDR-148 | — | — | — | — | — | — | — | 7.5 |
| Coating Properties | | | | | | | | |
| Drying time, 6 mil film | | | | | | | | |
| Set-to-touch, hrs | 2.0 | 1.8 | 2.6 | 12.4 | 10.4 | 3.0 | 5.8 | 2.4 |
| Surface-dry, hrs | 3.6 | 2.5 | 4.0 | 13.8 | 13.7 | 4.2 | 7.2 | 4.4 |
| Thru-dry, hrs | 5.0 | 8.9 | 6.0 | >36 | >30 | 7.7 | >28 | 15.2 |
| Pencil hardness after: | | | | | | | | |
| 24 hrs, 25° C. >3B[1,3] | >3B[2,3] | >3B[1,3] | >3B[1,4] | >3B[4] | >3B[3,5] | >3B[4] | >3B[4,5] | |
| 48 hrs, 25° C. | B[1,3] | HB[2] | 3B[1,3] | 2B[4] | >3B[4] | B | >3B[4] | 2B[3] |
| 72 hrs, 25° C. | F[1,6] | H[2] | 2B[1] | HB—F[1,3] | B | F[3] | HB—F | F[5] |
| 7 days, 25° C. | F[1] | F[2] | F[1] | F[1,6] | F—H[1] | F[3] | H[3,6] | F—H[5,6] |
| 24 hrs 25° C., 1 hr 80° C., 1 hr 125° C. | HB[1] | F[2] | HB[2] | 2B—B[1] | HB[1] | F[2] | 2B—B[5] | HB[5] |
| Gardner impact, in-lbs to fail after: | | | | | | | | |
| 24 hrs 25° C., | | | | ←>160/>160→ | | | | |
| 48 hrs 25° C. | | | | ←>160/>160→ | | | | |
| (dir./rev.) 72 hrs 25° C. | | | | ←>160/>160→ | | | | |
| 7 days 25° C., | | | | ←>160/>160→ | | | | |
| 24 hrs 25° C., 1 hr 80° C., 1 hr 125° C. | | | | ←>160/>160→ | | | | |

[1]High gloss finish without blemishes;
[2]Dull, low gloss finish; no blush;
[3]Slightly tacky surface;
[4]Tacky, undercured surface;
[5]Slightly blemished;
[6]Indented without marring with softer leads;
[7]Eponex ® 151 (Shell Chemical);
[8]AEP = N—Aminoethylpiperazine;
[9]BAPP = Bis(aminopropyl)piperazine
[10]TETA = Triethylenetetramine;
[11]IPDA = Isophoronediamine;
[12]1,2-DACH = 1,2-diaminocyclohexane;
[13]MIBPA = Methyliminobispropylamine;
[14]BAEE = Bis(aminoethyl)ether.
JEFFAMINE ® EDR-148 - triethylene glycol diamine A number of quite reactive amines were added to a cycloaliphatic epoxy resin/TMP triacrylate blend cured with JEFFAMINE® T-403. The amount of reactive amine added was equivalent to the amount of triacrylate present in the formulation. Addition of only a few of the reactive amines (AEP, BAPP, TETA, MIBPA) resulted in shortend drying times. Of these, only AEP and TETA produced blemish-free decorative coatings. The formulation containing TETA produced a dull, lusterless, blemished coating when heat cured. Of all of the reactive amines tested, only AEP and piperazine (Example 1-A) resulted in a totally acceptable coating.

EXAMPLE 3

Coatings Properties: Cures of Cycloaliphatic Epoxy Resin/ TMP Triacrylate Blends with JEFFAMINE ® D-230/Piperazine Curative Systems

| | 6253- | | | | |
|---|---|---|---|---|---|
| | -55A | -55B | -55C | -55D | 55E |
| Formulation: | | | | | |
| Cycloaliphathic epoxy resin[6] | 100 | 90 | 90 | 80 | 70 |
| TMP triacrylate | — | 10 | 10 | 20 | 30 |
| JEFFAMINE ® D-230 | 24.7 | 28.1 | 22.2 | 19.7 | 17.3 |
| Piperazine | — | — | 4.4 | 8.8 | 13.2 |
| Solvent(7) | — | — | 15 | 30 | 45 |
| Coating Properties | | | | | |
| Drying time, 6 mil film | | | | | |
| Set-to-touch, hrs | 32.8 | 33.7 | 0.2 | <0.1 | <0.1 |
| Surface-dry, hrs | 44.7 | 39.9 | 0.9 | 0.3 | 0.4 |
| Thru-dry, hrs | 54.4 | 59.8 | >24 | 0.3 | 0.4 |
| Pencil hardness after: | | | | | |
| 24 hrs, 25° C. | (3) | (3) | >3B[4] | >3B[4] | >3B[4] |
| 48 hrs, 25° C. | 3B | >3B[4] | 2B[5] | H[5] | H[5] |
| 72 hrs, 25° C. | 3B | 2B[5,6] | H[5] | H—2H[5] | H—2H[5] |
| 7 days, 25° C. | B[1] | H[5] | H[5] | F[5] | H—2H[5] |

-continued

Coatings Properties: Cures of Cycloaliphatic Epoxy Resin/ TMP Triacrylate Blends with JEFFAMINE ® D-230/Piperazine Curative Systems

|  | 6253- | | | | |
|---|---|---|---|---|---|
|  | -55A | -55B | -55C | -55D | 55E |
| 24 hrs 25° C., 1 hr 80° C., 1 hr 125° C. | F[1] | 2B[1] | HB—F[1] | HB—F[2] | HB[2] |
| Gardner impact, in-lbs to fail after: | | | | | |
| 24 hrs 25° C. | (3) | (3) | | →>160/>160← | |
| 48 hrs 25° C. | >160/ 140 | (3) | | →>160/>160← | |
| (dir./rev.) 72 hrs, 25° C. | | | ←>160/>160→ | | |
| 7 days, 25° C. | | | ←>160/>160→ | | |
| 24 hrs 25° C., 1 hr 80° C., 1 hr 125° C | | | ←>160/>160→ | | |

[1]High gloss, unblemished surface;
[2]Slightly wrinkled surface;
[3]Could not test; coating soft, tacky, incompletely cured;
[4]Coating soft, tacky, weak, undercured;
[5]Indented without marring with softer leads;
[6]EPONEX ® 151 (Shell Chemical Co.).
[7]50/50 pbw. blend of n-butanol, ethanol The curing of a cycloaliphatic epoxy resin with JEFFAMINE® D-230 resulted in excessively long film drying times. Addition of TMP triacrylate did not improve drying, probably because the reaction product of acrylate and JEFFAMINE® D-230 was quite soft, with a plasticizing effect. Addition of TMP triacrylate did not improve drying. Addition of piperazine to a system containing both epoxy resin and acrylate, even though a solvent was necessary, resulted in rapid gellation and rapid development of acceptable coating properties.

EXAMPLE 4A

Epoxy resin systems based on liquid bisphenol A resin (aromatic unsaturated) yellowed rapidly and significantly when subjected to accelerated exposure. The presence of an acrylate as a partial replacement of bisphenol A resin reduce yellowing somewhat. A cycloaliphatic epoxy resin system yellowed to a lesser degree than the bisphenol A resin system. Addition of acrylate a resin replacement had little effect on resin yellowing. Addition of piperazine or AEP produced a rapid curing formulation with even better yellowing (or non-yellowing) characteristics.

EXAMPLE 4B

Accelerated Exposure Testing of Clear Coatings

|  | 6253- | | | | | |
|---|---|---|---|---|---|---|
|  | -65A | -65B | -65C | -65D | -56A | -56B |
| Formulation: | | | | | | |
| Liquid DGEBA resin[4] | 100 | 80 | — | — | — | — |
| Cycloaliphatic epoxy resin[5] | — | — | 100 | 80 | 80 | 80 |
| TMP Triacrylate | — | 20 | — | 20 | 20 | 20 |
| JEFFAMINE ® T-403 | 42 | 50.8 | 34 | 43.4 | 27.2 | 27.2 |
| Piperazine | — | — | — | — | 8.8 | — |
| AEP[6] | — | — | — | — | — | 8.7 |
| Solvent[1] | — | — | — | — | 30 | — |
| Yellowing Properties:[2] | | | | | | |
| ΔY.I. after Q—U—V[3] exposure for: 24 hrs | 33.4 | 20.2 | 11.7 | 10.6 | 6.7 | 8.8 |
| 48 hrs | 40.8 | 25.4 | 23.0 | 14.3 | 10.3 | 12.7 |

[1]Solvent: 50/50 pbw mixture of n-butanol/ethanol;
[2]Clear coating of uniform thickness (6 mil thick) applied to white tile;
[3]Accelerated weathering tester full light, no water; temperature of cabinet 45° C.;Y.I. = yellowing index (ASTM D-1925) determined after Q—U—V exposure;
[4]Epoxy equivalent weight 185, EPON ® 828 (Shell);
[5]EPONEX ® 151 (Shell);
[6]AEP = N—aminoethylpiperazine.

|  | 6253- | | | | | | | | |
|---|---|---|---|---|---|---|---|---|---|
|  | -56A | -56B | -56D | -56C | -57A | -57B | -57C | -57D | -57E |
| Formulation: | | | | | | | | | |
| Cycloaliphatic epoxy resin[1] | 80 | 80 | 80 | 80 | 80 | 80 | 80 | 80 | 80 |
| TMP triacrylate | 20 | 20 | 20 | 20 | 20 | 20 | 20 | 20 | 20 |
| JEFFAMINE ® T-403 | 27.2 | 27.2 | 27.2 | 27.2 | 27.2 | 27.2 | 27.2 | 27.2 | 27.2 |
| Piperazine | 8.8 | — | — | — | — | — | — | — | — |
| AEP[2] | — | 8.7 | — | — | — | — | — | — | — |
| TETA[3] | — | — | 4.9 | — | — | — | — | — | — |
| BAPP[4] | — | — | — | 10.1 | — | — | — | — | — |
| IPDA[5] | — | — | — | — | 8.6 | — | — | — | — |

-continued

| | 6253- | | | | | | | | |
|---|---|---|---|---|---|---|---|---|---|
| | -56A | -56B | -56D | -56C | -57A | -57B | -57C | -57D | -57E |
| 1,2-DACH[6] | — | — | — | — | — | 5.8 | — | — | — |
| MIBPA[7] | — | — | — | — | — | — | 7.3 | — | — |
| BAEE[8] | — | — | — | — | — | — | — | 5.3 | — |
| JEFFAMINE® EDR-148 | — | — | — | — | — | — | — | — | 7.5 |
| Solvent[9] | 30 | — | — | — | — | — | — | — | — |
| Yellowing Properties | | | | | | | | | |
| ΔY.I. after Q—U—V exposure for: 25 hours | 6.7 | 8.8 | 7.7 | 16.1 | 9.0 | 4.6 | 7.5 | 6.6 | 5.6 |
| 48 hrs | 10.3[13] | 12.7[13] | 11.2[10] | 21.9[11] | 10.5[13] | 5.6[13] | 10.2[12] | 9.6[10] | 8.0[10] |

[1] EPONEX® 151 (Shell Chemical Co.);
[2] AEP = N—Aminoethylpiperazine;
[3] TETA = triethylene tetramine;
[4] BAPP = Bis(aminopropyl)piperazine;
[5] IPDA = Isophoronediamine;
[6] 1,2-DACH = 1,2-diaminocyclohexane;
[7] MIBPA = Methyliminobispropylamine;
[8] BAEE = Bis(aminoethyl)ether;
[9] Solvent: 50/50 pbw mixture of n-Butanol/ethanol;
[10] S1. blemished surface;
[11] Severely blemished surface;
[12] Blemished surface.
[13] High gloss surface without blemishes
JEFFAMINE® EDR-148 - triethyleneglycol diamine A number of the reactive amine systems produced clear coatings that were resistant to yellowing. However, many of these were previously ruled out for various reasons; i.e., slow drying, blemished surface, etc., so that only piperazine (in solution) or AEP were considered useful for the intended purpose.

| TABLE OF TEST METHODS | |
|---|---|
| Pencil hardness (cure) | ASTM D-3363-74 |
| Gardner impact | ASTM D-2794-69 |
| Yellowing index | ASTM D-1925 |
| ΔY.I. | Difference in Yellowing Index |

While particular embodiments of the invention have been described, it is well understood that the invention is not limited thereto since modifications may be made. It is therefore contemplated to cover by the appended claims any such modifications as fall within the spirit and scope of the claims.

What is claimed is:

1. An epoxy resin coating composition comprising the cured reaction product of:
   1. a cycloaliphatic epox resin containing at least 1.8 reactive 1,2-epoxy groups per molecule, mixed with an acrylate ester which contains at least three terminal acrylate or methacrylate groups, in a weight ratio of epoxy resin: acrylate ester o 2:1 to 10:1 reacted with 2. a curing amount of a polyether polyamine of the formula $$NH_2CH(CH_3)CH_2[OCH_2CH(CH_3)]_xNH_2$$

wherein x ranges from 2 to 6; mixed with piperazine or N-aminoethylpiperazine in approximately molar equivalent with the acrylate ester.

2. The coating composition of claim 1 wherein the acrylate ester is a triacrylate, tetraacrylate or pentaacrylate.

3. The coating composition of claim 1 wherein the acrylate ester is a triacrylate.

4. The coating composition of claim 1 wherein the acrylate ester is trimethylolpropane triacrylate.

5. The coating composition of claim 1 wherein the cycloaliphati epoxy resin is a fully saturated diglycidyl ether of bisphenol A resin.

6. The coating composition of claim 1 wherein the epoxy resin: acrylate ester weight ratio is 10:3 to 10:2.

7. An epoxy resin coating composition comprising the cured reaction product of:
   1. a cycloaliphatic epoxy resin containing at least 1.8 reactive 1,2-epoxy groups per molecule, mixed with an acrylate ester which contains at least three terminal acrylate or methacrylate groups in a weight ratio of epoxy resin: acrylate ester, of 2:1 to 10:1; reacted with
   2. a curing amount of a polyether polyamine of the formula $$\begin{array}{c} CH_2[OCH_2CH(CH_3)]_xNH_2 \\ | \\ CH_3CH_2-C-CH_2[OCH_2CH(CH_3)]_yNH_2 \\ | \\ CH_2[OCH_2CH(CH_3)]_zNH_2 \end{array}$$

wherein x+y+z ranges from 4 to 6 mixed with piperazine or N-aminoethylpiperazine in approximately molar equivalence with the acrylate ester.

8. The coating composition of claim 7 wherein the acrylate ester is a triacrylate, tetraacrylate or pentaacrylate.

9. The coating composition of claim 7 wherein the acrylate ester is a triacrylate.

10. The coating composition of claim 7 wherein the acrylate ester is trimethylolpropane triacrylate.

11. The coating composition of claim 7 wherein the cycloaliphatic epoxy resin is a fully saturated diglycidyl ether of bisphenol A resin.

12. The coating composition of claim 7 wherein the epoxy resin: acrylate ester weight ratio is 10:3 to 10:2.

13. An epoxy resin coating composition comprising the cured reaction product of:
   1. a cycloaliphatic epoxy resin containing at least 1.8 reactive 1,2-epoxy groups per molecule, mixed with a triacrylate in a weight ratio of epox resin: triacrylate of 10:3 to 10:2; reacted with
   2. a curing amount of a polyether polyamine of the formula $$NH_2CH(CH_3)CH_2[OCH_2CH(CH_3)]_xNH_2$$

wherein x ranges from 2 to 6; mixed with piperazine in approximate molar equivalence with the triacrylate.

14. The coating composition of claim 13 wherein the triacrylate is trimethylolpropane triacrylate.

15. An epoxy resin coating composition comprising the cured reaction product of:
 1. a cycloalphatic epoxy resin containing at least 1.8 reactive 1,2-epoxy groups per molecule mixed with a triacrylate in a weight ratio of epoxy resin: triacrylate of 10:3 to 10:2; reacted With
 2. a curing amount of a polyether polyamine of the formula $$CH_3CH_2-\underset{\underset{CH_2[OCH_2CH(CH_3)]_zNH_2}{|}}{\overset{\overset{CH_2[OCH_2CH(CH_3)]_xNH_2}{|}}{C}}-CH_2[OCH_2CH(CH_3)]_yNH_2$$

wherein x+y+z ranges from 4 to 6; mixed with piperazine in approximate molar equivalence with the triacrylate.

16. The coating composition of claim 15 wherein the triacrylate is trimethylolpropane triacrylate.

* * * * *

UNITED STATES PATENT AND TRADEMARK OFFICE
CERTIFICATE OF CORRECTION

PATENT NO. : 4,910,269
DATED : March 20, 1990
INVENTOR(S) : Harold George Waddill It is certified that error appears in the above-identified patent and that said Letters Patent is hereby corrected as shown below:

Col. 13, line 53, delete "o" and insert therefor --of--.

Signed and Sealed this

Nineteenth Day of June, 1990

Attest:

*Attesting Officer*

HARRY F. MANBECK, JR.

*Commissioner of Patents and Trademarks*